Figure 1:
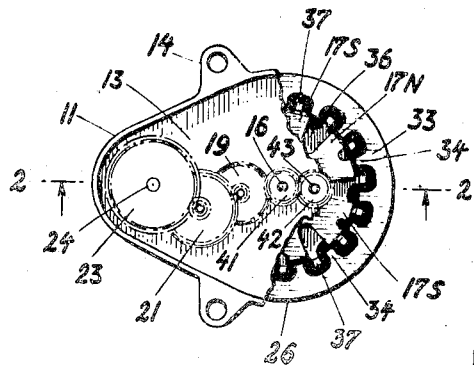

Feb. 17, 1948.  E. L. SCHELLENS  2,436,231
SELF-STARTING SYNCHRONOUS MOTOR
Filed Oct. 20, 1945

INVENTOR:
E. L. Schellens
BY
Morrison, Kennedy & Campbell
Attorneys.

Patented Feb. 17, 1948

2,436,231

UNITED STATES PATENT OFFICE 2,436,231

SELF-STARTING SYNCHRONOUS MOTOR

Eugene L. Schellens, Essex, Conn., assignor to The R. W. Cramer Company, Incorporated, Centerbrook, Conn., a corporation of Connecticut Application October 20, 1945, Serial No. 623,558

10 Claims. (Cl. 172—278)

This invention is a self-starting synchronous motor, more especially of the A. C. inductor type, but available for other types of A. C. electric motor wherein without any control the starting may occur unpredeterminedly either in the desired correct rotary direction or in the opposite incorrect direction, depending upon factors of chance, particularly the relative position of parts at the time the alternating current is applied and/or the instantaneous polarity of the stator poles.

The principal utility of the present invention is in connection with small synchronous motors, that is, of fractional horse power; and the general object of the invention is to afford such motors so constructed as to ensure starting in the correct direction promptly and with negligible extent of incorrect rotation. A further object is to ensure such desired results by a simple and compact means, which is not only effective and reliable in action but rugged and durable in practical use.

The motor hereof is of the characteristic kind wherein the rotor member is permanently magnetized and shaped to provide peripherally projecting poles of alternate polarity, its shaft connectable to operate clocks, switches etc.; the cooperating stator having outer and inner pole series alined adjacently to the rotor poles and energized with changing polarity by an A. C. annular coil, with iron parts determining the flux path from pole series to series, certain of which parts constitute a housing for the coil.

An instance of a synchronous motor on these principles is disclosed in the British patent granted to Chamberlain and Hookham, Ltd., No. 489,246 of June 26, 1937, which may be referred to for details not disclosed in the present application.

Motors on the principles just outlined run synchronously after starting, but are subject to the objections already recited; and various corrective plans have been tried to solve this special motor problem and ensure that the self-starting is in the correct direction, but have proven far from satisfactory on account of complexity, bulkiness, unreliability, short life or other reasons; while the existing objections are practically overcome by the present invention, of which an illustrative embodiment is hereinbelow disclosed. Other advantages will appear in the hereinafter following description of an illustrative embodiment thereof or will be understood by those conversant with the subject. To the attainment of such objects and advantages the present invention consists in the novel self-starting synchronous motor, and the novel features of combination, construction and detail herein illustrated or described.

Figure 2:
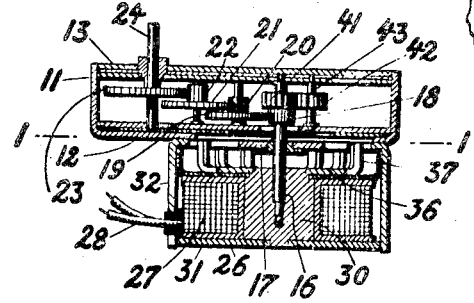

In the accompanying drawings,

Fig. 1 may be considered a top plan view of a small synchronous motor embodying the present invention, the same being partly broken away at the horizontal section line 1—1 of Fig. 2 to disclose certain of the interior parts.

Fig. 2 is a sectional view taken substantially on the section line 2—2 of Fig. 1.

Figure 3:
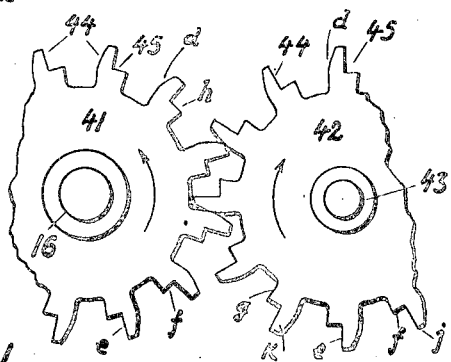

Fig. 3 on an enlarged scale is a detail top or face view of the cooperating motor gear and control gear of Figs. 1 and 2 shown in their normal relation when the motor is running continuously in the correct direction, the motor gear at the left turning counterclockwise and driving the control gear clockwise.

Figure 4:
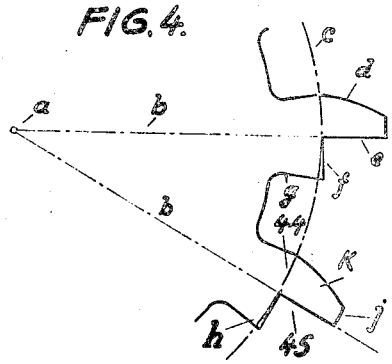

Fig. 4 on a yet larger scale is a diagrammatic view showing in detail the preferred construction of one or both of the gears shown in Fig. 3, and which two gears may be substantially identical.

Figure 5:
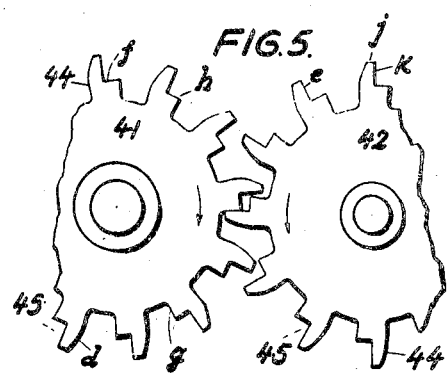
Figure 6:
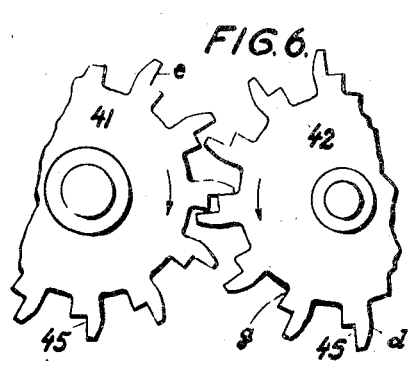
Figure 7:
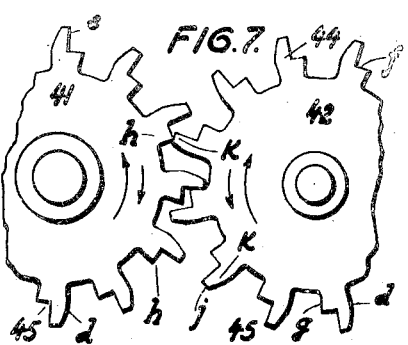

Figs. 5, 6 and 7 are a series of views similar to Fig. 3 but disclosing the cooperating action thereof when the motor shaft and the gear have started to rotate in the incorrect direction, the meshing gear teeth passing through relative abnormal coaction positions and terminating with the prompt and positive blocking of the motor gear and its shaft, for example in a manner such as is shown in Fig. 7.

In a motor of the kinds or types mentioned the present invention comprises, in combination with the motor shaft 16 carrying the rotor 17, and the stator 26, a direction control means including a toothed motor gear 41 rotated from or fast on the shaft and a control gear 42 in mesh with the motor gear; the teeth of these two gears at their leading and trailing sides respectively having normal formation for smooth continuous running in the correct direction, but at their opopsite sides or contours having reentrant cutaways or special formations providing recesses or notches cooperable to permit an appreciable extent of loose play or backlash between the gears; the cutaways or recesses being of a shape, such as that disclosed, which causes abnormal coaction and consequent blocking when the torque urges incorrect direction of rotation, whereby on such occasions the gears become promptly self-obstructed, with positive stoppage, and with sufficient mechanical reaction from the impact to change the rotation and establish smooth running in the correct direction.

A motor illustrating the present invention may have a frame in the nature of a casing 11, of nonmagnetic material, and closed by a base wall 12 and a top wall 13, one of these formed with extending ears 14 for mounting the motor in a suitable location and posture. The motor elements are shown mounted on the base wall 12, which is perforated for the passage of the motor shaft 16 to the built-in gearing system within the casing. The motor shaft may have fixed bearings, for example at one end on the frame wall 13, the other shaft end turning for convenience within an axial bore in the central stator core 30 to be described.

The scalloped or indented rotor element 17 of the motor is mounted on the shaft 16, and is shown as a thin disk-like member of steel, or other permanent magnet material or alloy, ferrous or non-ferrous, low in weight and permanently magnetized. Beyond the rotor the motor shaft 16 is shown as carrying the drive pinion 18 of a gear train, which train may comprise the united gears 19 and 20 followed by the gears 21 and 22 and the final gear 23, proportioned to give extensive speed reduction, finally delivered through the shaft 24 of the gear 23, said shaft being the power output element of the motor. As a specific example the rotor and shaft may turn 240 R. P. M., with a speed reduction of 60 to 1, thus delivering 4 R. P. M. at the output shaft, suitable for operating certain timing devices.

The scalloped or indented stator element, numbered 26 as a whole, is composed of magnetic material, preferably soft iron, and is attached to the base wall 12 of the frame. As a part of the stator there is shown the usual exciting coil 27 of annular form adapted to be connected by terminals or leads 28 with a source of alternating current. The stator center or core 30 is located within the annular coil 27, these elements being preferably coaxial with the motor axis and shaft 16.

The stator core is the center of the magnetic circuit and is interconnected with further stator parts arranged to extend around or embrace the annular exciting coil. Thus at the back or side opposite to the rotor the magnetic parts of the stator include a wall 31, extended outwardly and formed into a peripheral outer part or wall 32, which may be cylindrical and which reaches to the front or rotor side of the stator, where the iron is formed into a flange or ring 33 which is formed with successive recesses or scallops affording a series of stator poles 34 which, as a matter of terminology, may be termed the outer poles, these shown as projecting inwardly from the periphery. It is understood that the outer and inner poles of the stator are polarized electromagnetically and in an alternating manner, each series being N when the other is S. Completing the magnetic circuit, the stator has an inner part or wall 36, at the front side of the core and outstanding therefrom with its rim or margin scalloped to produce a series of inner poles 37, shown as bent axially to approach the outer poles. The stator inner pole ends are located in circular alignment with the outer poles, and in the same plane or a closely adjacent plane therewith and with the poles of the rotor. The shown dished formation of the part 36 with the inner poles 37 affords a recess accommodating the rotor so that the poles of the latter may travel substantially in the plane of the stator poles.

As a specific instance, the rotor 17 may have a series of six pole members radially projecting from its circular center or body 17 and each of double character or notched with two arms or poles. This rotor is magnetized permanently to afford three north pole members designated 17N alternated with three south pole members designated 17S. Since each of these pole members has two subpoles or ends, due to its central cleft it results that the rotor is one with six double poles or pairs, or 12 ends, thus affording in effect two separate N poles and thereybeyond two separate S poles and so on. On the other hand the stator is shown with a series of fifteen evenly spaced outer poles, and evenly interposed between them fifteen inner poles; these two series being excitable oppositely and alternatingly in the conventional manner.

The control means of this invention, built in or embodied with the motor, for insuring prompt starting in the correct direction, comprises the pinion or gear 41 which is mounted upon the motor shaft 16 and in that sense is caused to turn with the rotor. Cooperating with the motor gear is a control gear or pinion 42 mounted on a parallel shaft 43 having its bearings in the casing walls 12 and 13. Thus the motor gear drives the control gear, and these two gears or pinions, thus related, may be the initial gears in a gear train, such as that already described, although shown as preferably independent of the customary gear train. These cooperating gears 41 and 42 are shown in Figs. 1 and 2 and in larger scale in the remaining figures, where it is shown, for example in Fig. 3, that the operative sides of the gear teeth 44 of both gears, that is, the leading sides of the teeth in the motor gear 41, turning counterclockwise, and the trailing sides of the teeth of the control gear 42 turning clockwise, are of normal formation, as with involute curves, for smooth and continuous correct-direction rotation and drive.

On the other or opposite sides of the teeth however, of the respective gears, or at least one of them, there is a special formation providing, for every tooth or the major number of teeth in each gear, a reentrant outline or cutaway recess 45 of substantial depth. These tooth recesses are formed or machined out of the tooth sides which take no part in the forward driving and therefore do not interfere with normal operation. When the gears however are idle the recessed structure permits loose play or backlash between the two gears, and this loose play is such as to cause abnormal coaction between the gears, including quick blocking of the motor gear and shaft rotation when the impulse or torque urges it in the incorrect direction; whereby the pair of gears becomes promptly self-obstructed, with momentary positive stoppage and sufficient reaction from impact to change the rotation direction and establish smooth continuous running in the correct direction.

While there are different ways in which the teeth of the respective gears may be cut into at their normally idle sides, within this invention, a particularly efficient formation is found to be that indicated in Figs. 3 to 7, which may be described in detail as follows. In Fig. 3 the cutaway feature 45 does not function since the motor gear or driver 41 is rotating in the correct direction, as the long arrow shows. In Fig. 4 the diagram shows the preferred cutaway contour, with respect to two successive teeth, of either or both of the gears, being preferably alike for both gears, and preferably applied to all of the teeth of each gear. Indeed it is preferable, and advantageous for manufacturing purposes, that the two gears with their recessed or mutilated teeth be identical.

In the Fig. 4 diagram, from the gear axis $a$ there extend the radial centerlines $bb$ of the successive teeth 44, and these are intersected by the pitch circle $c$ of the gear. Each tooth is shown as having a normal contour $d$ at the side which takes part in correct-direction driving. At the opposite side the recess 45 may subtract substantially a quadrant from each tooth, an advantageous form being that which is shown, wherein the line $e$ of cut of the recess coincides approximately or at least partly with the radial centerline $b$; while at an angle thereto the other line $f$ of the cut or reentrant contour of the recess is substantially along or tangent to the pitch circle or line $c$; and the uncut remainder $g$ of the contour extends from the pitch line to the root line of the gear. The cut line $f$ and the contour line $g$ bound a corner or shoulder $h$, through which shoulder of the motor gear tooth the eventual blocking may occur. The blocking surface $j$ of the control gear may be simply the extreme top or outer edge of the tooth. By reason of the recessing of the tooth its remaining outer end, beyond the pitch circle, constitutes what may be termed a spur or half tooth-end $k$, the extremity of which is what effects the obstructing in the shown embodiment, made possible by the recessing and loose play between the two gears.

In operation, with correct drive direction, as in Fig. 3, the cooperation of gears is normal. When the starting torque or impulse tends to turn the motor gear 41 wrongly or clockwise the series of actions occur which are shown in Figs. 5, 6 and 7, the short arrows thereon showing the direction of short incorrect rotation, while the longer arrows in Fig. 7 show the subsequent correct continuous drive direction. In Fig. 5 the contour portion or surface $g$ of gear 41 has backed up against the surface $e$ of the tooth spur $k$ of gear 42, thus carrying along the gear 42 with the incorrect rotation. The motion continuing, the surface $e$ of spur $k$ of gear 41 assumes the incorrect drive of gear 42 as shown in Fig. 6 by pressing against the surface $g$ of its active tooth. The action terminates by the corner or shoulder $h$ of the tooth on gear 41 coming dead against the blocking surface or tooth end $j$ of a tooth on gear 42. This affords a positive stop, both gears coming instantaneously to rest, with sufficient impact to cause gear 41 to rebound and rotate far enough in the correct counterclockwise direction to initiate smooth running, thus accomplishing the purposes of the invention.

Having described the illustrated motor and its principles it should be pointed out that many modifications can be made within the principles explained. The particular cutaway form of tooth recess may be altered so long as during incorrect rotation it permits a part of a motor gear tooth to become positively obstructed by a part of a control gear tooth, resulting in rebound and correction of direction.

By this invention the backward or incorrect turning of the motor gear operates, by the aid of the backlash action, to shift the control gear around backwardly to its final or obstructing position, whereat a part of its obstructing tooth contour is met by a part or shoulder of a motor gear tooth for positive stoppage of said gear, followed by correct or forward rotation as desired.

In the disclosed embodiments, the invention has the advantage of consuming but negligible power. There is only rolling friction between the rotor gear and control gear and hence substantially no added load upon the power of the motor. In any case the friction and resistance are practically zero. For these several reasons there is appreciably better efficiency and less tax on the power and torque of the motor, an important factor in low power synchronous motors, as compared with prior known motors with one-way devices such as hereinbefore referred to involving pawls or ratchets or cams or linkages or other power consuming mechanisms.

What I claim is:

1. In a self-starting synchronous electric motor having a stator and a light shaft-carried rotor and being of a kind, such as the inductor type, wherein without control the starting may occur unpredeterminedly either in the desired correct rotary direction or in the opposite incorrect direction, control means embodied with such motor for ensuring its prompt starting in the correct direction, comprising, in combination with a toothed motor gear rotatable from the rotor shaft, a control gear directly in mesh with and driven by the motor gear; the motor gear teeth at their leading sides and the control gear teeth at their trailing sides having normal formations for smooth and continuous correct-direction rotation and drive, and the other sides of the teeth thereof having cut-aways providing substantial recesses and permitting loose play or backlash between the two gears such as to cause abnormal coaction including quick blocking of the motor gear and shaft rotation when urged in the incorrect direction; whereby whenever the motor torque or impulse starts in the incorrect direction the cooperating motor gear and control gear become promptly self-obstructed and blocked with positive stoppage and with sufficient reaction and rebound from impact to change the direction of rotation of the motor gear and rotor and thereby initiate and establish smooth running in the correct direction.

2. A motor as in claim 1 and wherein the tooth recesses are deep and each forms a shoulder which functions by impact during correcting action.

3. A motor as in claim 1 and wherein the tooth recesses are each formed by cutting or shaping substantially along the tooth centerline and along the pitch circle, to their intersection.

4. A motor as in claim 1 and wherein the tooth cutaways are alike for both gears, and said gears are identical in essential structure.

5. A motor as in claim 1 and wherein the tooth cutaways are alike for both gears and all the teeth of both gears have the same cutaway formation.

6. A small self-starting electric motor of the kind referred to having a rotor whose starting impulse or torque is indeterminate in direction, and in combination therewith a toothed pinion turning with the rotor and a control pinion meshing continuously with and driven by the rotor pinion, said pinions having the same circular pitch, and at least one of said pinions having teeth thereof at the tooth sides opposite to the sides which take part in normal driving recessed in a manner permitting loose play between the teeth of the pinions and causing, when the starting torque is in the incorrect direction, a prompt self-blocking of the pinions, without locking thereof but with reversal by impact and rebound resulting in normal rotation in the correct direction.

7. An inductor type synchronous motor as in claim 6 and wherein both of said pinions have said recessed formation wherein a corner or shoulder formed on the rotor pinion teeth can strike a blocking surface on the control pinion teeth when the starting impulse is in the incorrect direction.

8. A motor as in claim 7 and wherein the motor gear and control gear as to their recessed-tooth formation are identical.

9. A small self-starting synchronous electric motor of the kind having an electromagnet stator and a permanent-magnet rotor whose starting impulse or torque is indeterminate in direction, and in combination therewith a toothed motor pinion turning with the rotor and a control pinion meshing continuously with and driven by the motor pinion, at least one of said pinions having teeth thereof at the tooth sides opposite to the sides which take part in the correct-direction driving recessed in a manner permitting some loose play between the teeth of the pinions and causing, when the starting torque occurs in the incorrect direction, a prompt self-blocking of the pinions, with instantaneous reversal by impact and rebound causing initiation of normal rotation of the motor pinion in the correct direction; such self-blocking occurring by reason of a part or shoulder of a tooth of the motor pinion becoming positively obstructed by a part or surface of a tooth of the control gear during the short reverse turning of the motor gear in the incorrect direction.

10. A self-starting synchronous motor of the kind set forth wherein the rotary tendency is in undetermined starting direction, the same having a rotor-actuated driving gear and a control gear driven directly thereby, said two gears having equal circular pitch spacing and embodying a corrective means comprising gear teeth whose sides that are active during normal running have normal contours, but have substantially reentrant contour portions at those tooth sides that are idle during normal running, shaped to form shouldered recesses which permit backlash to an extent for such driving gear tooth shoulders to make non-locking impact against such driven gear tooth ends, thereby operating instantaneously to arrest incorrect and by rebound to initiate correct direction of rotation.

EUGENE L. SCHELLENS.

REFERENCES CITED

The following references are of record in the file of this patent:

UNITED STATES PATENTS

| Number | Name | Date |
|---|---|---|
| 1,976,880 | Graseby | Oct. 16, 1934 |
| 2,064,699 | Stahl et al. | Dec. 15, 1936 |

FOREIGN PATENTS

| Number | Country | Date |
|---|---|---|
| 449,863 | England | July 6, 1936 |
| 491,403 | England | Sept. 1, 1938 |